United States Patent
Gallant et al.

(10) Patent No.: US 7,136,387 B2
(45) Date of Patent: Nov. 14, 2006

(54) METHOD OF AND SYSTEM FOR PROVIDING QUALITY OF SERVICE IN IP TELEPHONY

(75) Inventors: John K. Gallant, Plano, TX (US);
Steven R. Donovan, Plano, TX (US)

(73) Assignee: MCI, LLC, Basking Ridge, NJ (US)

( * ) Notice: Subject to any disclaimer, the term of this patent is extended or adjusted under 35 U.S.C. 154(b) by 526 days.

(21) Appl. No.: 09/370,504

(22) Filed: Aug. 9, 1999

(65) Prior Publication Data

US 2003/0133454 A1    Jul. 17, 2003

(51) Int. Cl.
*H04L 12/28* (2006.01)

(52) U.S. Cl. .............. 370/395.52; 370/352; 370/395.1; 370/466

(58) Field of Classification Search ................ 370/352, 370/355, 356, 358, 385, 395, 401, 465, 466, 370/467; 379/230
See application file for complete search history.

(56) References Cited

U.S. PATENT DOCUMENTS

| | | | |
|---|---|---|---|
| 5,634,012 A | 5/1997 | Stefik et al. | |
| 5,680,116 A | 10/1997 | Hashimoto et al. | |
| 5,737,333 A * | 4/1998 | Civanlar et al. | 370/352 |
| 5,828,844 A * | 10/1998 | Civanlar et al. | 709/228 |
| 5,835,710 A * | 11/1998 | Nagami et al. | 709/250 |
| 5,867,571 A * | 2/1999 | Borchering | 379/230 |
| 5,883,894 A | 3/1999 | Patel et al. | |
| 5,889,777 A * | 3/1999 | Miyao et al. | 370/345 |
| 5,903,559 A * | 5/1999 | Acharya et al. | 370/355 |
| 5,909,430 A * | 6/1999 | Reaves | 370/254 |
| 5,930,348 A | 7/1999 | Regnier et al. | |
| 5,933,412 A * | 8/1999 | Choudhury et al. | 370/218 |
| 5,953,338 A | 9/1999 | Ma et al. | |
| 5,960,416 A | 9/1999 | Block | |
| 5,991,292 A | 11/1999 | Focsaneanu et al. | |
| 6,058,113 A | 5/2000 | Chang | |
| 6,073,160 A | 6/2000 | Grantham et al. | |
| 6,081,513 A * | 6/2000 | Roy | 370/260 |
| 6,088,358 A | 7/2000 | Tomita et al. | |
| 6,097,722 A | 8/2000 | Graham et al. | |
| 6,137,777 A | 10/2000 | Vaid et al. | |
| 6,141,686 A | 10/2000 | Jackowski et al. | |
| 6,151,319 A * | 11/2000 | Dommety et al. | 370/395 |
| 6,157,648 A | 12/2000 | Voit et al. | |
| 6,178,169 B1 * | 1/2001 | Hodgkinson et al. | 370/351 |
| 6,185,215 B1 * | 2/2001 | Aho | 370/402 |

(Continued)

OTHER PUBLICATIONS

Barzilai et al., "Design and Implementation of an RSVP-Based Quality of Service Architecture for Integrated Services Internet", 1997, IEEE.
Bernet et al, "A Framework for Differentiated Services", Feb. 1999, http://www.ietf.org/internet-draft-ieft-diffserv-framework-02.txt.

(Continued)

*Primary Examiner*—Chi Pham
*Assistant Examiner*—Phuc Tran

(57) ABSTRACT

A method and system for providing quality of service in an IP telephony session between a calling party and a called party establishes a high quality of service ATM virtual circuit for the session between first and second devices, each of the devices having ATM capability and IP capability. The first and second devices provide bidirectional translation between IP media and ATM media. The system transports IP media for the session between the calling party and the first device, and between said called party and a second device. The virtual circuit transports ATM media for the session between the first and second devices. An intelligent control layer provides IP and ATM signaling to set up the session.

8 Claims, 4 Drawing Sheets

U.S. PATENT DOCUMENTS

| | | | |
|---|---|---|---|
| 6,205,148 B1 * | 3/2001 | Takahashi et al. | 370/401 |
| 6,222,842 B1 * | 4/2001 | Sasyan et al. | 370/397 |
| 6,233,234 B1 * | 5/2001 | Curry et al. | 370/356 |
| 6,243,753 B1 * | 6/2001 | Machin et al. | 709/227 |
| 6,252,857 B1 * | 6/2001 | Fendick et al. | 370/254 |
| 6,292,478 B1 * | 9/2001 | Farris | 370/352 |
| 6,349,098 B1 * | 2/2002 | Parruck et al. | 370/395.6 |
| 6,351,465 B1 * | 2/2002 | Han | 370/395.43 |
| 6,353,856 B1 * | 3/2002 | Kanemaki | 709/229 |
| 6,366,578 B1 * | 4/2002 | Johnson | 370/353 |
| 6,507,577 B1 * | 1/2003 | Mauger et al. | 370/356 |
| 6,603,769 B1 * | 8/2003 | Thubert et al. | 370/401 |
| 6,731,642 B1 * | 5/2004 | Borella et al. | 370/401 |

OTHER PUBLICATIONS

Boyle et al., "The COPS (Common Open Policy Service) Protocol", Aug. 1999, http://www.ieft.org/internet-drafts/draft-ieft-rap-cops-07.txt.

Boyle et al., "COPS Usage for RSVP", Jun. 1999, http://www.ieft.org/internet-draft-ieft-diffserv-framework-02.txt.

Braden et al., "Resource ReSerVation Protocol (RSVP): Version 1 Functional Specification", Sep. 1997, Network Working Group RFC 2205, ftp://ftp.isi.edu/in-notes/rfc2205.txt.

Braun, T., "Internet Protocols for Multimedia Communications", Oct. 1997, IEEE Multimedia.

Eriksson et al., "SIP Telephony Gateway on DTM", Jul. 2, 1999, Bachelor's Thesis, Royal Institute of Technology, Sweden.

* cited by examiner

METHOD OF AND SYSTEM FOR PROVIDING QUALITY OF SERVICE IN IP TELEPHONY

BACKGROUND

The present invention relates generally to the field of Internet telephony, and more particularly to a method of and system for providing quality of service in an Internet telephony session.

Two trends are currently occurring in the telecommunications marketplace. First, telephony services are being added to Internet protocol-based devices. Second, Asynchronous Transfer Mode (ATM) networks are being built with the ability to support user specified quality of service (QoS) on a per connection basis, as part of the ATM switched virtual circuit service capability.

Each of these trends have problems. The primary problem with the introduction of telephony services to the IP network is one providing predictable QoS on a per call/connection basis. Although technologies are being developed in the Internet community to address this problem, there is currently no way to guarantee QoS on a per connection basis through an IP network. The primary problem with the second trend is not one of basic service capability, but is rather one of access to the service. Today virtually all desktop devices have access to an IP network through some sort of local area network technology, for example through Ethernet. The problem is that these desktop devices generally do not have access to ATM networks that provide the per call/connection guarantee QoS.

The primary method of addressing QoS in the current IP-BASED networks is to over-provision the amount of bandwidth available in the network. This approach will work as long as the usage of the network stays within the bounds of the available bandwidth. If the usage of the network is not predictable, then it is difficult, for example, to prevent a low priority file transfer from interfering with a connection established to carry real-time voice or video data.

The primary method of providing ATM switched virtual circuit services to devices that do not have native ATM support is to install routers between the IP network and the ATM network that have the ability to generate ATM switched virtual circuits on a per IP flow basis. The problems with this approach are: (1) possible destination IP addresses need to be provisioned in the router ahead of time, and (2) it is not possible to define, on an IP flow basis, which IP flow should get the ATM switched virtual circuit service and which should get IP best efforts service. If a destination address is provisioned in the ATM interworking router, then all connections to that destination address will require an ATM switched virtual circuit.

SUMMARY

The present invention provides a method of and a system for providing quality of service in an IP telephony session between a calling party client and a called party client. The system of the present invention establishes a high quality of service ATM virtual circuit for the session between first and second devices, each of the devices having ATM capability and IP capability. The first and second devices provide bidirectional translation between Internet Protocol (IP) media and ATM media. The system transports IP media for the session between the calling party client and the first device, and between the called party client and the second device. The virtual circuit transports ATM media for the session between the first and second devices. An intelligent control layer provides IP and ATM signaling to set up the session.

In one embodiment of the present invention, the first and second devices include access control managers that are bridges between an IP network and an ATM network. The intelligent control layer assigns a temporary session IP proxy address for the called party at the first access control manager and a temporary session IP proxy address for the calling party at the second access control manager. The system establishes a switched virtual circuit through the ATM network for the session between the first access control manager and the second access control manager by assigning a temporary session calling party number at the first access control manager and a temporary session called party number at the second access control manager.

During the session, the system routes IP media from the calling party to the temporary IP proxy address of the called party at the first access control manager. The first access control manager packages the IP media in ATM cells for transport through the virtual circuit to the second access control manager. The system then routes IP media from the second access control manager to the called party. Similarly, the system routes IP media from the called party to the temporary IP proxy address of the calling party at the second access control manager. The second access control manager packages the IP media in ATM cells for transport through the virtual circuit to the first access control manager. The system then routes IP media from the first access control manager to the calling party.

In an alternative embodiment, the first and second devices include routers that have both IP and ATM capability. The calling party client obtains an authentication ticket and then initiates an IP telephony session with a quality of service request. When the called party client accepts the session, the calling party client initiates setup of a resource reservation protocol IP media session with an ingress router. The ingress router then sets up the IP media session through an egress router to the called party client. When the IP media session is setup, the ingress router sets up an ATM switched virtual connection with the egress router.

DETAILED DESCRIPTION

Figure 1:
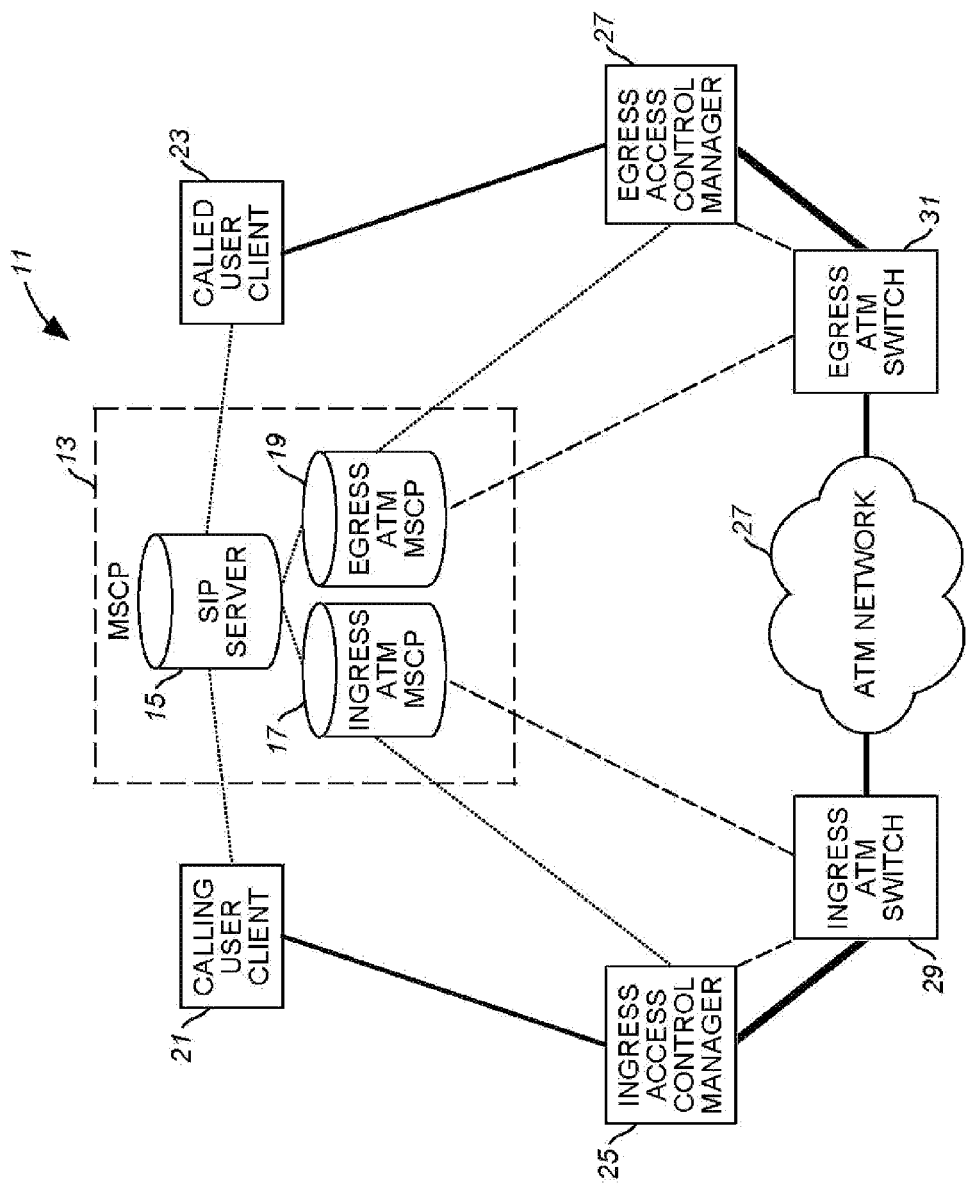
FIG. 1 is a block diagram of a preferred embodiment of the system of the present invention.

Referring now to the drawings, and first to FIG. 1, a system according to a preferred embodiment of the present invention is designated generally by the numeral 11. System 11 includes a media service control point (MSCP) 13. MSCP 13 includes an IP telephony session establishment server, which in the preferred embodiment is a session initiation protocol (SIP) server 15, an ingress Asynchronous Transfer Mode (ATM) MSCP 17, and an egress ATM MSCP 19. As will be explained in detail hereinafter, MSCP 13 provides an intelligent control layer for the establishment of an Internet Protocol (IP) telephony session between a first IP telephony user client 21 and a second IP telephony user client 23.

System 11 includes an ingress access control manager 25 and an egress access control manager 27. Access control managers 25 and 27 provide a media gateway between IP telephony user clients 21 and 23 and an ATM network 27. Ingress access control manager 25 provides an ATM media and signaling interface to an ingress ATM switch 29 of ATM network 27. Similarly, egress access control manager 27 provides an ATM media and signaling interface to an egress ATM switch 31 of ATM network 27.

In FIG. 1, IP signaling paths are indicated with dotted lines and ATM of signaling paths are indicated with dashed lines. IP media paths are indicated with solid lines and ATM media paths are indicated with bold solid lines.

In the embodiment of FIG. 1, a Quality of Service (QoS) connection is provided by routing traffic on the QoS capable backbone provided by ATM network 27. According to the present invention, an ATM connection is created for the IP telephony session between user clients 21 and 23.

QoS extensions to the data network applications part (DNAP) protocol perform the signaling between MSCP 13 and access control managers 25 and 27. The access control managers 25 and 27 establish the ATM QoS capable connection. While in the preferred embodiment of present invention, the QoS capable connection is provided by ATM switched virtual circuits, the present invention can also be implemented in a variety of other technologies, such as SONET, and wave division multiplexing.

As will be explained in detail hereinafter, the data path for the session is secured against unauthorized traffic by the use of proxy addressing. The proxy addressing requires translation by the access control managers 25 and 27 to route the media to its intended destination. During session establishment, the addresses of the media stream endpoints are exchanged between user client 21 and user client 23. The signaling message containing the media address of user client 21 is changed to reflect a proxy address, which is an interface at egress excess control manager 27. The excess control manager interface is assigned on a per session basis. The per session interface uniqueness is accomplished by the allocation and deallocating of ephemeral ports at the access control managers. Associated with the ephemeral ports are the addresses used to create and transit the ATM connection. Likewise, the signaling message containing the media address for user client 23 is changed to reflect a proxy address at ingress access control manager 25.

The system of the present invention dynamically configures QoS connections and ensures their security in two ways. First, the QoS connection is dynamically configured by the use of ATM switched virtual connections. The switched virtual connections are created on a per session basis during call establishment. MSCP 13 invokes the IP to ATM interface mechanisms of access control managers 25 and 27 with DNAP QoS messages. As will be explained in detail hereinafter, access control manager 25 launches a user network interface (UNI) protocol setup. The ATM traffic sent to and received by access control managers 25 and 27 is intercepted by ATM switches 29 and 31, respectively, and forwarded to their associated ATM MSCPs 17 and 19. The ATM MSCPs create the switched virtual circuit between ATM switches 29 and 31. Access control managers 25 and 27 map the media stream of the session to its switched virtual circuit and the session traffic transits their respective switch virtual circuit.

The second aspect of the real-time configuration solution is the dynamic securing of the access to the connections. This is done by dynamically allocating the proxy addresses during session establishment from a pre-provisioned proxy address pool. The proxy addresses are returned to the user clients 21 and 23 in the signaling messages. The session proxy address mapping is created at the MSCP and communicated to access control managers 25 and 27 by the DNAP protocol. The proxy addresses and the actual session addresses are held at the SIP server 15 and the access control managers 25 and 27 for the duration of the session. When the session is terminated, proxy addresses are deallocate.

Figure 2:
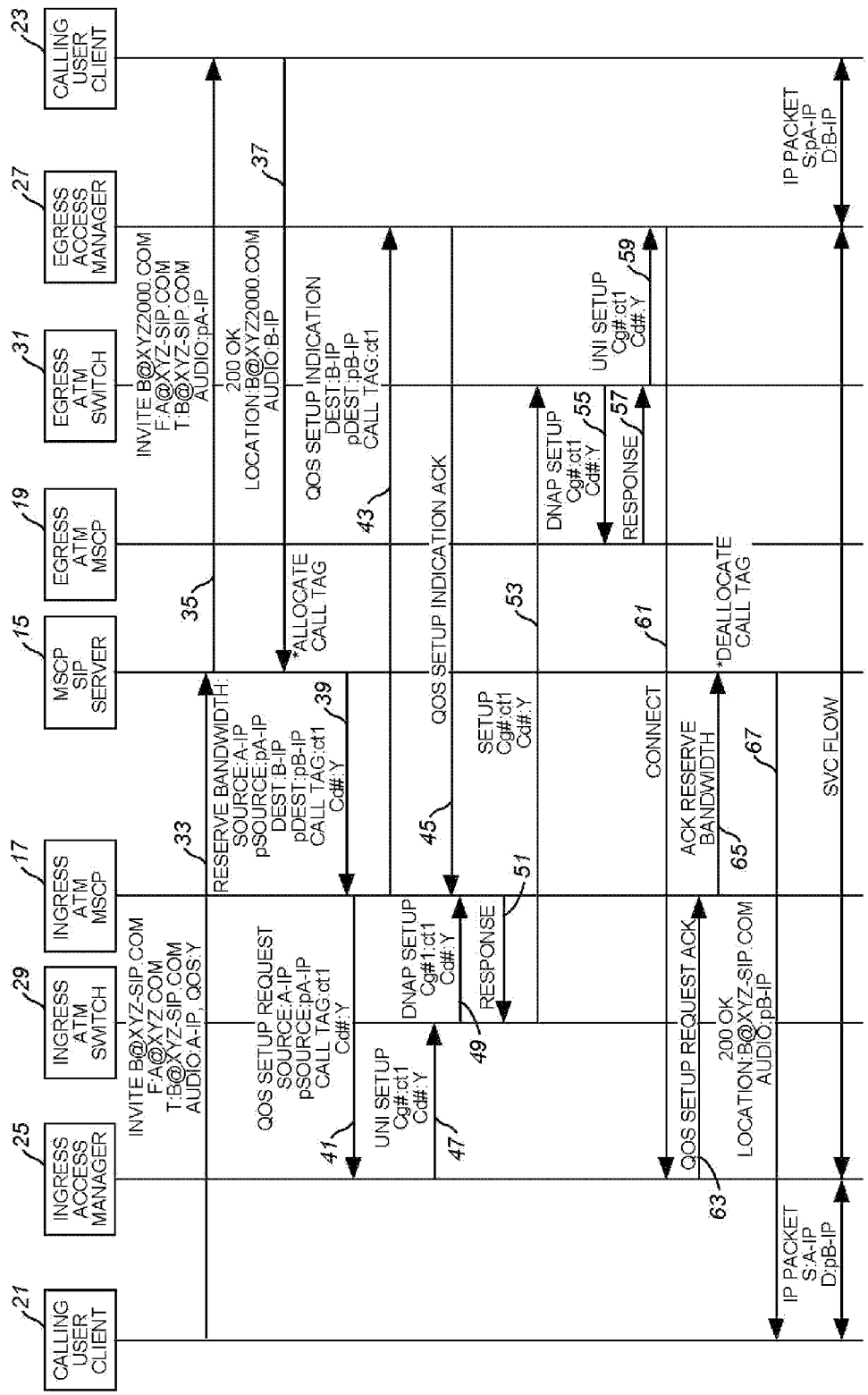
FIG. 2 is a call flow diagram illustrating the signaling and call setup according to the embodiment of FIG. 1.

Referring now to FIG. 2, there is shown a call flow diagram of session initiation according to the embodiment of FIG. 1. User client 21 initiates the session by sending a SIP INVITE message 33 to user client 23. For purposes of illustration, the IP address of user client 21 is A@XYZ.COM. The SIP INVITE is addressed to user client 23 at a proxy address at MSCP SIP server 15, which for purposes to illustration is B@XYZ-SIP.COM. The SIP INVITE specifies the audio source as the real IP address of user client 21, and specifies that QoS is requested. Upon receipt of invite 33, SIP server 15 sends an invite 35 to the real IP address of user client 23, at B@XYZ2000.COM. Invite 35 specifies the audio source as a temporary IP proxy address allocated to user client 21 at egress access control manager 27, which for purposes of illustration is A@ACM-Y.COM. If user client 23 accepts the session, user client 23 sends a 200OK SIP response 37 back to SIP SERVER 15, specifying an audio destination as its real IP address. While in the preferred embodiment, SIP IP telephony signaling is used, other IP signaling protocols, such as H.323 may be used.

Upon receipt of response 37, SIP server 15 allocates a call tag, and sends a reserve bandwidth message 39 to ingress ATM MSCP 17. Message 39 specifies the audio destination for the session of as a temporary IP proxy address allocated to user client 23 at ingress access control manager 25. For purposes of illustration, the temporary IP proxy address allocated user client 23 is B@ACM-X.COM. The bandwidth reservation message also identifies the call tag and specifies the called number for the ATM connection as egress access control manager 27.

Upon receipt of bandwidth reservation message 39, ingress ATM MSCP 17 sends a QoS setup request 41 to ingress access control manager 25. Setup request 41 identifies the real source address and proxy source address for user client 21. Setup request 41 also identifies the call tag and the called party number. Ingress ATM MSCP 17 also sends a QoS setup indication message 43 to egress access control manager 27. Setup indication 43 identifies the real destination address and proxy destination address for user client 23, as well as the call tag and the called party number for the ATM session. Egress access control manager 27 responds to setup indication 23 with a setup indication acknowledgment 45 back to ingress ATM MSCP 17. Upon receipt of the QoS setup request 41, ingress access control manager 25 sends a user network interface (UNI) protocol setup message 47 to ingress ATM switch 29. Upon receipt of UNI setup message 47, ingress ATM switch 29 sends a DNAP setup 49 to ingress ATM MSCP 17. When ingress ATM MSCP 17 responds, as indicated at 51, ingress ATM switch 29 sends a setup message 53 to egress ATM switch 31. Upon receipt of setup message 53, egress ATM switch 31 sends a DNAP setup message 55 to egress ATM MSCP 19. When egress ATM MSCP 19 responds, as indicated at 57, egress ATM switch 31 sends a UNI setup message 59 to egress access control manager 27.

Upon receipt of setup message 59, egress access control manager 27 sends a CONNECT message 61 to ingress access control manager 25. Upon receipt of CONNECT message 61, ingress access control manager 25 responds to QoS setup request 41 with a QoS setup request acknowledgment 63 back to ingress ATM MSCP 17. Upon receipt of setup request acknowledgment 61, ingress ATM MSCP 17 responds to the reserve bandwidth message 39 with a reserve bandwidth acknowledgment message 65 back to MSCP SIP server 15. Upon receipt of reserve bandwidth acknowledgment 65, SIP server 15 deallocate the call tag and sends a SIP 200 OK response 67 back to user client 21. The OK response identifies the audio destination as the temporary IP proxy address allocated to user client 23 at ingress access control manager 25. Then, user client 21 sends IP media packets addressed to user client 23 at the temporary proxy address at access control manager 25. Similarly, user client 23 sends IP media packet addressed to user client 21 at the temporary proxy address at egress access control manager 27.

From the foregoing, it may be seen that the embodiment of FIG. 1 provides QoS for IP telephony sessions between IP user clients. Through the use of temporary proxies, user clients 21 and 23 are unaware that their session is carried on an ATM switched virtual circuit. User clients 21 and 23 use standard SIP messaging and standard proxying for call setup and no special intelligence is required on the part of the user clients 21 and 23. An intelligent network layer makes the system of the present invention transparent to user clients 21 and 23.

Figure 3:
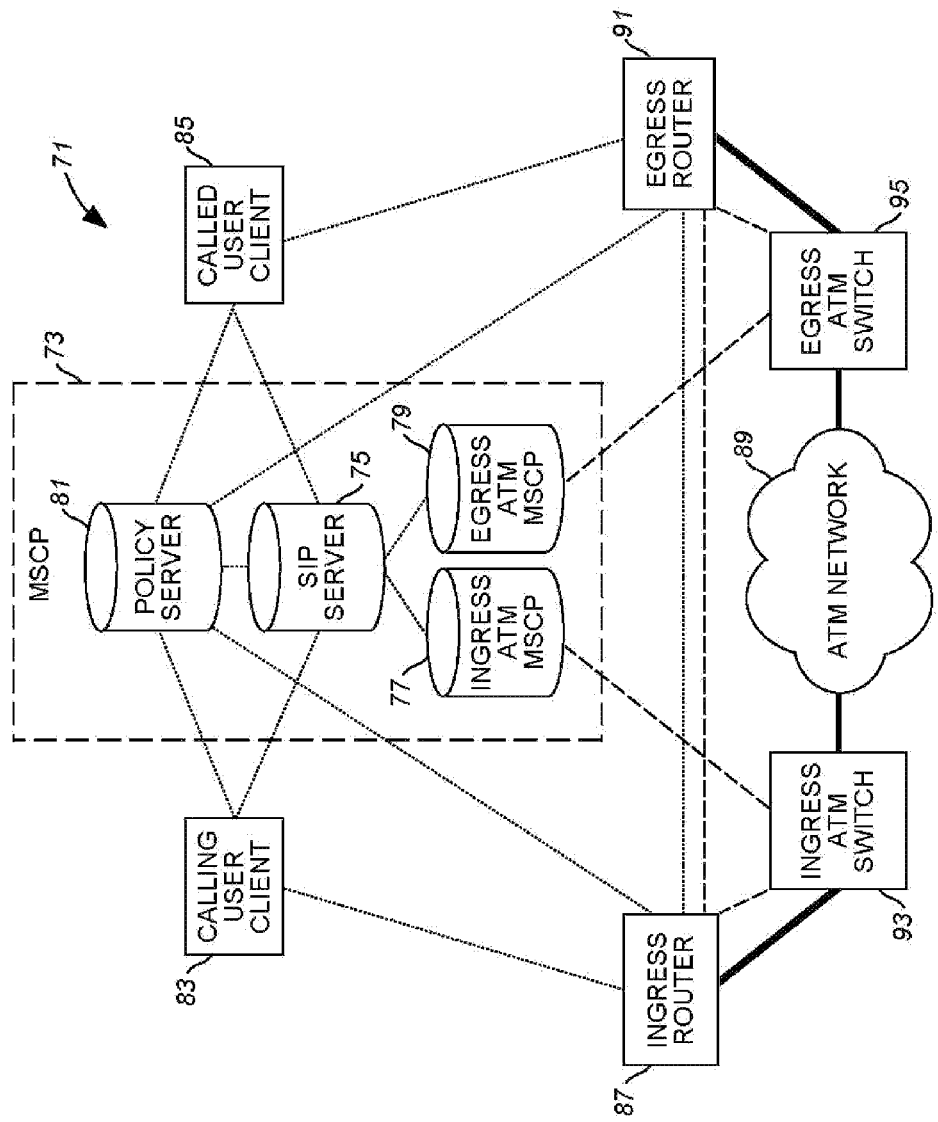
FIG. 3 is a block diagram of an alternative embodiment of the system of the present invention.

Referring now to FIG. 3, an alternative embodiment of the system of the present invention is designated generally by the numeral 71. System 71 includes MSCP indicated generally at 73. MSCP 73 includes an MSCP SIP server 75, an ingress ATM MSCP 77, and an egress ATM MSCP 79. Additionally, MSCP 73 includes a policy server 81. MSCP 73 is adapted to establish a QoS IP telephony session between a calling user client 83 and a called user client 85.

An ingress router 87 provides an interface between IP user client 83 and an ATM network 89. An egress router 91 provides interface between user client 85 and ATM network 89. Ingress router 87 provides an interface to an ingress ATM switch 93 of ATM network 89. Similarly, egress router 91 provides an interface to an egress ATM switch 95 of ATM network 89.

Figure 4:
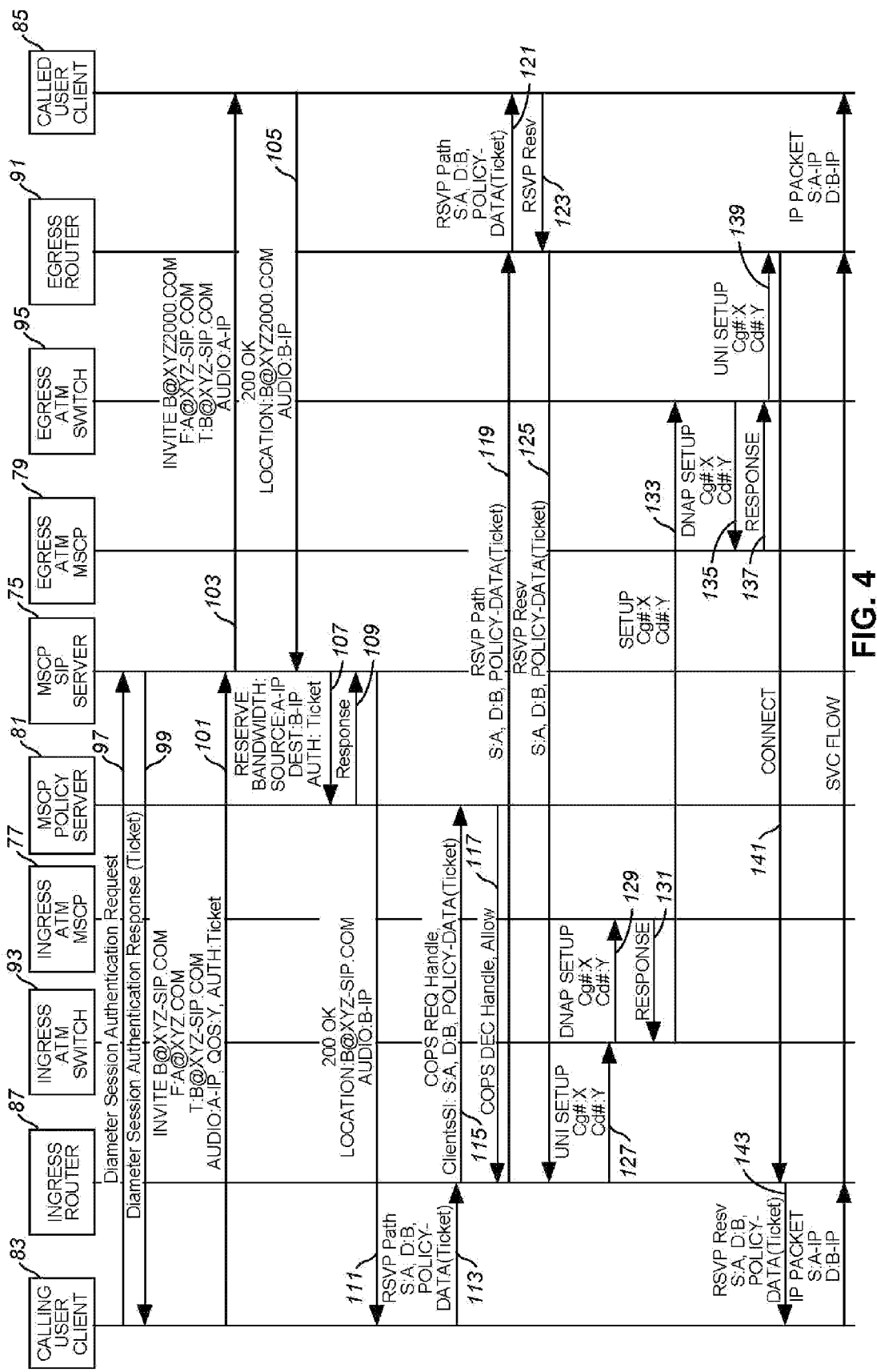
FIG. 4 is a call flow diagram illustrating the signaling and call setup according to the embodiment of FIG. 3.

Referring now to FIG. 4, there is shown a call flow diagram of session initiation according to the embodiment of FIG. 3. User client 83 initiates the session with a Diameter protocol session authentication request 97 addressed to MSCP SIP server 75. Server 75 responds with a Diameter session authentication response (ticket), as indicated at 99. Then, user client 83 sends a SIP INVITE message 101 to user client 85. For purposes of illustration, the IP address of user client 85 is A@XYZ.COM. The SIP INVITE 101 is addressed to user client 85 at a proxy address at MSCP SIP server 75, which for purposes to illustration is B@XYZ-SIP.COM. The SIP INVITE 101 specifies the audio source as the real IP address of user client 83, and specifies that QoS is requested. The SIP INVITE 101 also includes the authentication ticket received in response to Diameter session authentication request 97. Upon receipt of the SIP INVITE 101, SIP server 75 sends an INVITE 103 to the real IP address of user client 85, at B@XYZ2000.COM. INVITE 103 specifies the audio source as the IP address of user client 83. If user client 85 accepts the session, user client 85 sends a 200OK SIP response 105 back to SIP Server 75, specifying an audio destination as its real IP address.

Upon receipt of 200OK SIP response 105, SIP server 75 sends a reserve bandwidth message 107 to MSCP policy server 81. Message 107 specifies the audio source for the session of as the real IP address of user client 83, and the audio destination for the session as the real IP address of user client 85. The message 107 also includes the authentication ticket. Upon receipt of the message 107, MSCP policy server 81 sends a response 109 back to MSCP SIP server 81. Then, SIP server 75 sends a SIP 200OK response 111 to user client 83.

Upon receipt of 200OK response 111, user client 83 sends a resource reservation protocol (RSVP) path message 113 to ingress router 87. Then, ingress router 87 sends a COPS request handle message 115 to MSCP policy server 81. When MSCP policy server 81 responds, as indicated at 117, ingress router 87 sends an RSVP path message 119 to egress router 91. Then, egress router 91 sends an RSVP path message 121 to user client 85. User client 85 responds with an RSVP reservation response 123 back to egress router 91. Egress router 91 then responds with an RSVP reservation response 125 back to ingress router 87.

Upon receipt of response 125, ingress router 87 sends a UNI setup message 127 to ingress ATM switch 93. Upon receipt of UNI setup message 127, ingress ATM switch 93 sends a DNAP setup 129 to ingress ATM MSCP 77. When ingress ATM MSCP 77 responds, as indicated at 131, ingress ATM switch 93 sends a setup message 133 to egress ATM switch 95. Upon receipt of setup message 133, egress ATM switch 95 sends a DNAP setup message 135 to egress ATM MSCP 79. When egress ATM MSCP 79 responds, as indicated at 137, egress ATM switch 95 sends a UNI setup message 139 to egress router 91.

Upon receipt of setup message 139, egress router 91 sends a CONNECT message 141 to ingress router 87. Upon receipt of CONNECT message 141, ingress router 87 responds to RSVP path message 113 with an RSVP reserve response 143 back to user client 83. Then, the IP telephony session is established between user client 83 and user client 85.

The embodiment of FIGS. 3 and 4, distributes a certain amount of system intelligence to user clients 83 and 85. User clients 83 and 85 are responsible for a greater part of call setup than are user clients 21 and 23 of the embodiment of FIGS. 1 and 2. User clients 83 and 85 process signaling in Diameter and RSVP protocols in addition to signaling in SIP protocol.

From the foregoing it may be seen that the present invention overcomes the shortcomings of the prior art. The present invention dynamically establishes and secures QoS IP telephony sessions by routing traffic on a high QoS backbone, which is preferably an ATM backbone. Those skilled in the art will recognize alternative embodiments, given the benefit of this disclosure. Accordingly, the foregoing disclosure is intended for purposes of illustration and not limitation.

What is claimed is:

1. A method of providing quality of service in an Internet Protocol (IP) telephony session between a calling party and a called party, the method comprising:

assigning a first temporary session IP proxy destination address for said called party at a first device having IP capability and ATM capability;

assigning a second temporary session IP proxy source address for said calling party at a second device having IP capability and ATM capability;

establishing an ATM virtual circuit for said session between said first device and said second device based on the assigned first and second temporary session IP proxy addresses;

transporting IP telephony media for said session between said calling party and said first device; and transporting IP telephony media for said session between said called party and said second device.

2. The method as claimed in claim 1, wherein said first and second devices are routers.

3. The method as claimed in claim 1, wherein said establishing an ATM virtual circuit between said first and second devices comprises:
   identifying a calling party number for said session at said first device; and
   identifying a called party number for said session at said second device.

4. A method of providing quality of service in an IP telephony session between a calling party and a called party, the method comprising:
   assigning a temporary IP proxy destination address to the called party at a first access control manager operatively connected with the calling party via a first IP network;
   assigning a temporary IP proxy source address to the calling party at a second access control manager operatively connected with the called party via a second IP network;
   establishing a switched virtual circuit for the session between the first access control manager and the second access control manager;
   routing IP media traffic from said calling party to said called party IP proxy destination address at said first access control manager via the first IP network;
   routing IP media traffic from said called party to said calling party IP proxy source address at said second access control manager via the second IP network;
   translating IP media traffic received at said called party IP proxy address at said first access control manager to ATM traffic for transport through said virtual circuit from said first access control manager to said second access control manager; and
   translating IP media traffic received at said calling party IP proxy address at said second access control manager to ATM traffic for transport through said virtual circuit from said second access control manager to said first access control manager.

5. The method as claimed in claim 4, wherein said assigning a temporary IP proxy source address to the calling party comprises selecting an IP proxy address from a pool of calling party IP proxy addresses allocated to said second access manager.

6. The method as claimed in claim 4, wherein said assigning a temporary IP proxy destination address to the called party comprises selecting an IP proxy address from a pool of called party IP proxy addresses allocated to said first access manager.

7. The method as claimed in claim 6, further comprising:
   translating ATM traffic received at said temporary IP proxy destination address to IP media traffic for transport to said called party; and
   translating ATM traffic received at said temporary IP proxy source address to IP media traffic for transport to said calling party.

8. A system for providing a quality of service IP telephony session between a calling party and a called party, the system comprising:
   a control point operatively connected to the calling party and the called party via an IP network;
   a first device operatively connected to the calling party via the IP network and further operatively connected to an ATM network; and
   a second device operatively connected to the called party via the IP network and further operatively connected to the ATM network,
   wherein, upon receipt of a call request from the calling party, the control point dynamically assigns a proxy source IP address associated with the second device to the calling party and a proxy destination IP address associated with the first device to the calling party, and wherein the first device and the second device establish a virtual circuit through the ATM network for an IP telephony session between the calling party and the called party using the dynamically assigned proxy source IP address and the proxy destination IP address.

* * * * *